Figure 1:
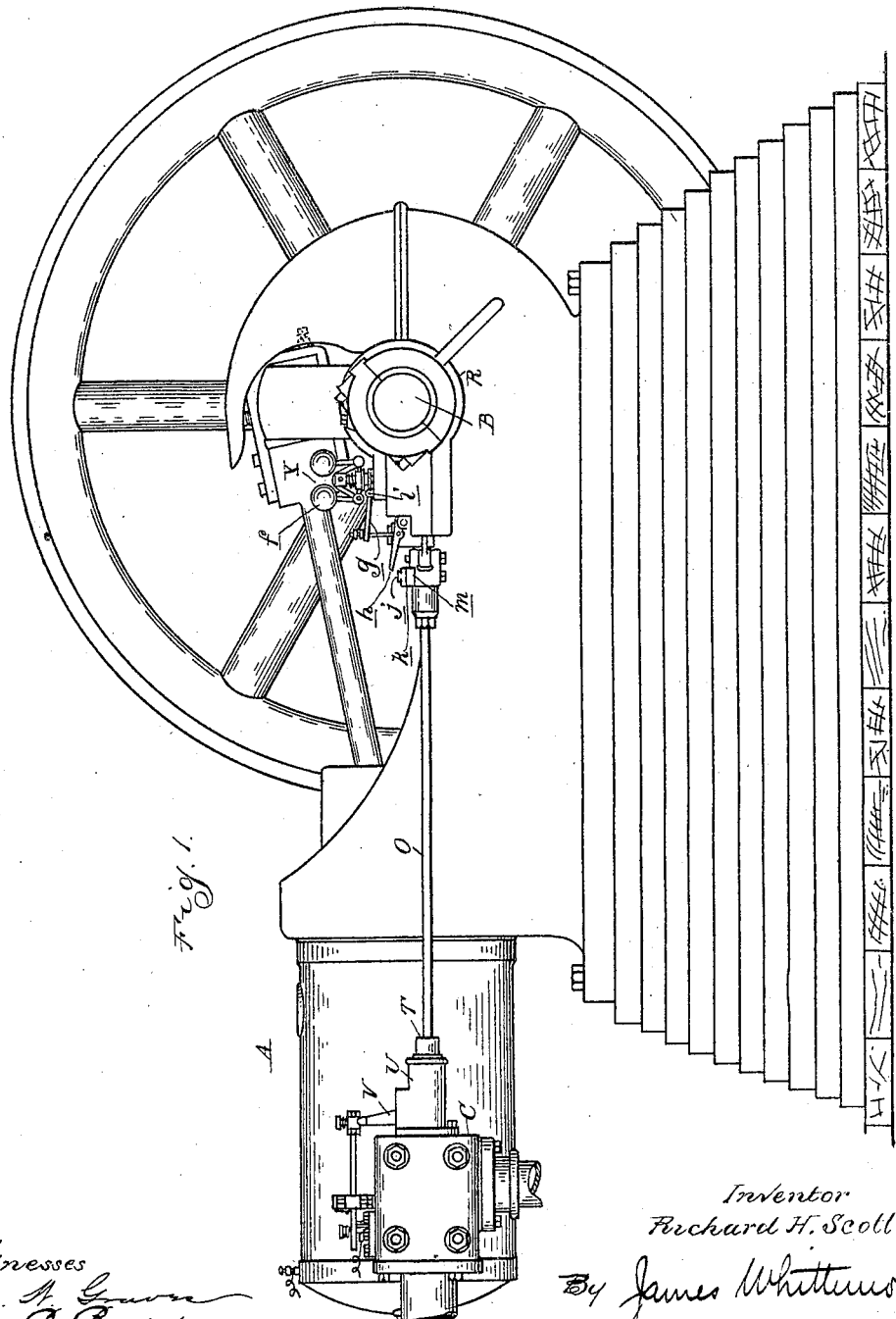

No. 798,461. PATENTED AUG. 29, 1905.
R. H. SCOTT.
VALVE GEAR FOR EXPLOSION ENGINES.
APPLICATION FILED APR. 1, 1904.

2 SHEETS—SHEET 1.

Witnesses
Geo. H. Graven
Jas. P. Barry

Inventor
Richard H. Scott
By James Whittemore
Atty.

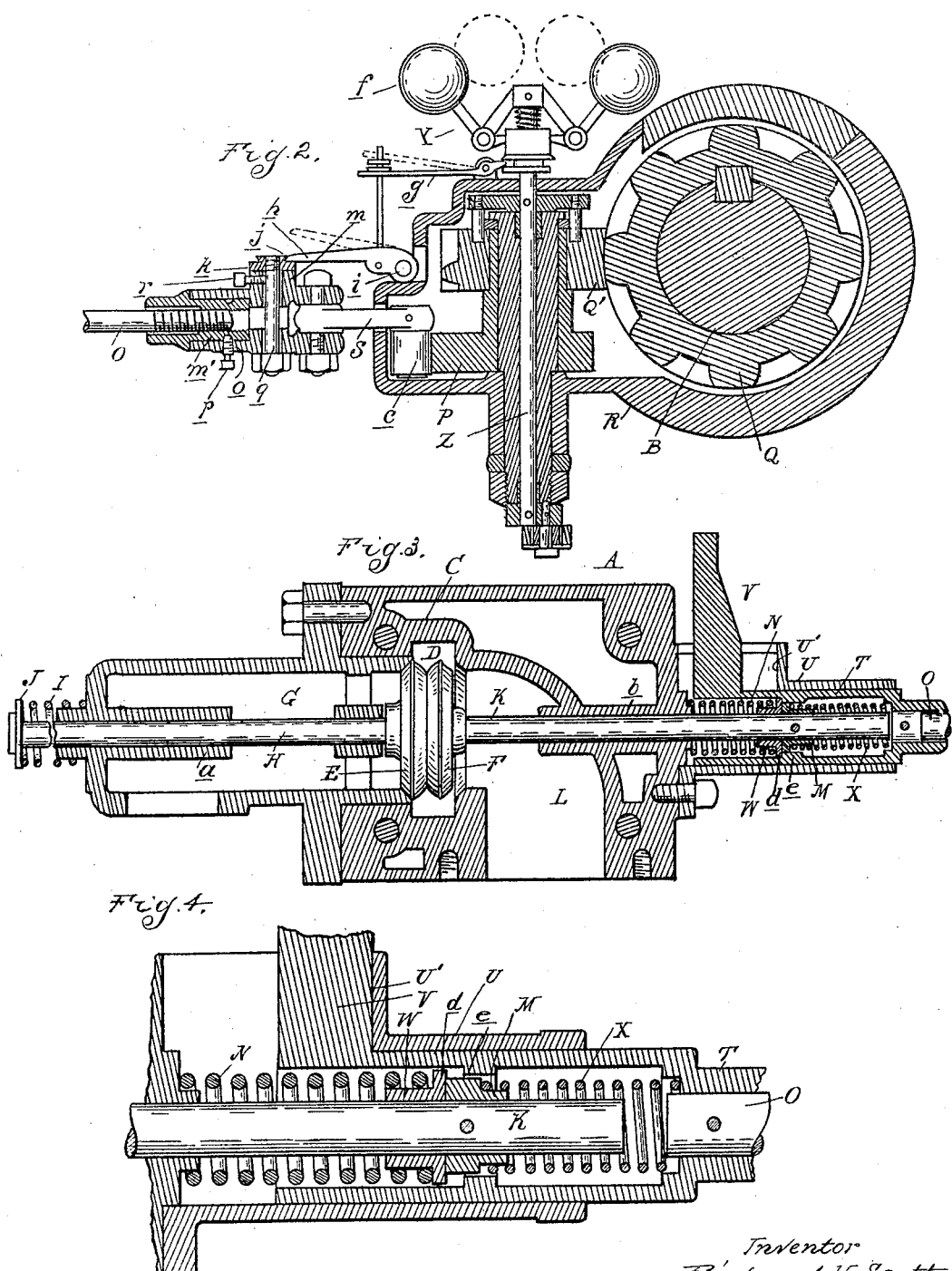

UNITED STATES PATENT OFFICE.

RICHARD H. SCOTT, OF DETROIT, MICHIGAN, ASSIGNOR TO THE OLDS GASOLINE ENGINE WORKS, OF LANSING, MICHIGAN, A CORPORATION OF MICHIGAN.

VALVE-GEAR FOR EXPLOSION-ENGINES.

No. 798,461.   Specification of Letters Patent.   Patented Aug. 29, 1905.

Application filed April 1, 1904. Serial No. 201,132.

*To all whom it may concern:*

Be it known that I, RICHARD H. SCOTT, a citizen of the United States, residing at Detroit, in the county of Wayne and State of Michigan, have invented certain new and useful Improvements in Valve-Gear for Explosion-Engines, of which the following is a specification, reference being had therein to the accompanying drawings.

The invention relates to explosion-engines, and has more particular reference to the mechanism controlling the valves and the means employed for governing the speed.

The invention consists in the construction, arrangement, and combination of parts, as hereinafter set forth.

In the drawings, Figure 1 is a diagrammatic elevation of an engine to which my improvement is applied. Figs. 2 and 3 are enlarged views of the valve controlling and governing mechanism. Fig. 4 is an enlarged view showing a portion of Fig. 3.

A is the cylinder, and B the crank-shaft, of an explosion-engine of any suitable construction.

C is the valve-chest on one side of the cylinder and communicating therewith through the port D.

E and F are respectively the inlet and exhaust valves, which are seated on opposite sides of the port D and in axial alinement with each other. The valve E controls the inlet-conduit G for the explosive mixture, and the stem H of the valve passes centrally through this conduit and out therefrom through the bearing $a$.

I is a spring for holding the valve E normally to its seat, which spring is preferably located at the end of the casing G and sleeved upon the stem H, having a bearing against a collar J thereon.

The valve F is provided with a stem K, which passes through the exhaust-conduit L and out through a bearing $b$ in the chest C.

M is a collar or fixed shoulder on the stem K, and N is a spring sleeved upon the stem between said collar and the casing C and serving to hold the valve F normally to its seat.

The valve F is mechanically operated by a valve-rod O, arranged in alinement with the stem K, and which rod also actuates the sparking mechanism. This valve-rod is itself actuated by a cam P, driven from the crank-shaft of the engine, preferably through the medium of the worm Q and worm-wheel Q'. The cam P is so shaped and timed as to operate not only the valve F, but also the sparking mechanism, as will be hereinafter set forth. As shown in the drawings, the worm-wheel Q' and cam P are arranged to rotate about a vertical axis, and the cam P is arranged below the worm-gear. These parts are preferably inclosed within a suitable housing R, which also includes the worm Q.

S is a link pivotally connected to the rod O and at its opposite end provided with an antifriction-roller $c$, which normally bears against the cam P. The opposite end of the rod O is connected with a sleeve T, which surrounds the stem K of the valve F and also the spring N thereon. This sleeve is supported in an outer bearing or housing U, which is preferably secured to the end of the valve-casing C.

V is an arm projecting upward from the sleeve T and passing through a slotted bearing U' in the casing U. The function of this arm is to actuate the sparker mechanism, which latter may be of any suitable construction adapted to be actuated by a reciprocating member and which is not illustrated in the drawings.

The rod O and sleeve T are not directly connected to the stem K of the valve F; but the latter is actuated through the medium of the sleeve T by the following construction:

W is a collar sleeved upon the stem K adjacent to the collar M thereon and forming the bearing against which the outer end of the spring N abuts. This collar W is provided with outwardly-projecting flanges or lugs $d$, which extend beyond the collar M and into the path of the flange or lugs $e$, projecting inward from the sleeve T.

X is a spring sleeved upon the stem K and bearing at one end against the collar M and at the other end against the outer end of the sleeve T.

The arrangement of parts just described is such that when the rod O is in its initial position the sleeve T will be retracted, so that the lugs $e$ are spaced from the flange or lugs $d$ on the collar W. Thus in the primary movement of the rod O it will merely actuate the sleeve $T^2$ and the arm V, carried thereby, without actuating the stem K. As soon, however, as the rod has moved a sufficient distance to take up the lowest motion between the lugs *e* and flange *d* the said parts will contact, whereupon further movement of the rod and sleeve will actuate the collar W, compressing the spring N. The movement of the collar W will permit the spring X (the tension of which is considerably less than that of the spring N) to actuate the collar M and move the stem K to open the valve F.

From the above description it will be understood that the movement of the cam P will first actuate the arm V for the purpose of operating the sparker and later, through the medium of the spring X, will actuate the stem K and valve F. This valve in opening is moved to bear against the inlet-valve E, so that as long as the valve F remains open the tension of the spring X is acting as an auxiliary to the spring I in maintaining the valve V to its seat. This construction permits of using a spring of lighter tension for the spring I, which will facilitate the opening of the valve E when the explosive mixture is drawn into the cylinder. On the other hand, when the exhaust-valve F is open the combined tension of the springs X and I is sufficient to prevent the valve E from opening by the suction of the exhausting products. The return movement of the rod O is effected first by the expansion of the spring N, which moves the collar W, stem K, and sleeve T until the valve F is seated. The remaining movement of the rod O and sleeve T is caused by the expansion of the spring X, which while insufficient to overcome the tension of the spring N is sufficient to actuate the sleeve. Thus in the movement of the cam P the roller *c* will be normally maintained in contact with the cam, and the movement of the rod O in both phases of its reciprocation will be governed by the cam.

The governing of the engine is effected by mechanism which under certain conditions will lock the rod O from return movement, thereby maintaining the exhaust-valve F open and the inlet-valve E closed, so that the engine will miss one or more explosions. To accomplish this result, I preferably employ any suitable construction of centrifugal governor which is driven by the engine and which in operation controls a locking-latch for the rod. As shown, Y indicates a centrifugal governor driven by a spindle Z, projecting upward through the housing R and connected to the worm-wheel Q. *f* indicates the weighted arms, which are thrown outward by centrifugal force. *g* is a link connection between said governor and a latch *h*, which latter is pivoted at *i* to the casing R and is adapted to engage with the shoulder *j* on the rod O. In the normal position of parts—that is, where the speed of the engine is not above normal—the link *g* is held in a position where the latch *h* is out of engagement with the shoulder *j*, thereby permitting the free reciprocation of the rod O. As soon, however, as the speed of the engine is increased above normal the movement of the weighted arms will depress the link *g*, moving the latch *h* into the path of the shoulder *j*, thereby arresting movement of the latter. The shoulder *j* is preferably formed of a member *k*, which is adjustably secured to a fitting *m*, forming the connection between the end of the rod O and the link S. This fitting is socketed to receive a collar *m'* in screw-threaded engagement with the end of the rod O, in which the collar is grooved at *o* for engagement with a set-screw *p* in the socket, the engagement being such that by turning the collar *m'* on the rod the length of the latter may be adjusted, while the set-screw *p* serves to lock the collar from turning and also to secure it in the fitting *m*. The adjustment of the member *k* on the fitting *m* is effected by securing said member *k* by a bolt *q*, which passes through a slot or aperture in the fitting *m* of a greater diameter than the bolt. This bolt has a threaded engagement with the member *k* and is adapted to clamp the latter upon the fitting. To hold the parts in this position and to form a means of accurate adjustment, a set-screw *r* is arranged to bear against the bolt *q* and hold it in its adjusted position. The latch *h* is prevented from accidentally disengaging from the shoulder *j* by undercutting the latter and beveling the end of the latch to engage therewith. As this would lock the latch from being withdrawn by the governor, the cam P is formed to impart an over movement to the rod O that is more than sufficient to effect the complete opening of the valve F. This over movement is permitted by reason of the fact that the spring X forms a yielding connection between the rod O and stem K of the valve. Thus in each revolution of the cam the fitting *m* is moved sufficiently to retract the undercut shoulder *j* from its engagement with the latch *h*, permitting the latter to be withdrawn whenever the governor retracts the links *g*.

What I claim as my invention is—

1. The combination with a valve of an actuating member therefor, a resilient yielding member intermediate said valve and actuating member, mechanical means for temporarily arresting movement of said valve during the initial movement of said actuating member, and means for subsequently releasing said valve whereby it is operated by said resilient member.

2. The combination with a valve of an actuating member therefor, a resilient yielding member intermediate said actuating member and valve, mechanical means for temporarily arresting the opening of said valve during the initial movement of said actuating member, means subsequently operated by said actuating member to release said valve and permit the same to be opened by the tension of said resilient member, and said mechanical means operating to close said valve in the return movement of said member.

3. The combination with a valve of an actuating-rod therefor, a resilient yielding member intermediate said rod and valve, a counteracting resilient member of greater tension operating to close said valve against the tension of said yielding member, a lost-motion connection between said rod and said counteracting member, means operated by said rod subsequent to its initial movement for relieving the tension of said counteracting member on said valve whereby it is permitted to be opened by said yielding member, said counteracting tension member being adapted to close the valves in the return movement of said rod.

4. The combination with a valve and a longitudinally-movable actuating-stem therefor, of a resilient member operating upon said stem to close said valve, and an actuating-rod in alinement with said stem, a yielding resilient member of lesser tension than said valve-closing resilient member, arranged intermediate said rod and stem, and a lost-motion connection between said rod and valve-closing resilient member whereby the tension of the latter is relieved from said valve-stem subsequent to the initial movement of said rod.

5. The combination with a valve and a longitudinally-movable actuating-stem therefor, of a spring sleeved upon said valve-stem, and having a bearing thereon, the tension of said spring operating to close the valve, a valve-operating rod in alinement with said valve-stem, a tubular extension of said rod surrounding said spring, a collar on said stem forming the abutment for said spring, a spring of lesser tension sleeved on said stem intermediate said collar and said rod, and a shoulder on said tubular extension adapted after the initial movement of said rod to relieve the tension of said valve-closing spring from said collar and permit the tension of the other spring to open the valve.

6. The combination with a valve and a longitudinal-movable actuating-stem therefor, of a tubular housing through which said stem passes, a valve-rod having a tubular extension slidingly secured within said housing and surrounding said valve-stem, a collar fixed on said valve-stem, a spring interposed between said collar and said valve-rod, sleeved upon said stem within said tubular extension of the rod, a collar slidingly secured on said stem and adapted to bear against said fixed collar, a spring of greater tension interposed between said sliding collar and a fixed bearing in said housing and acting with its tension counter to that of the lighter spring, and a shoulder on said tubular extension of the rod adapted after the initial movement of said rod to bear against said sliding collar, and compress said heavier spring whereby said lighter spring will open the valve.

7. The combination with a valve and a longitudinal-movable actuating-stem therefor, of the collar M fixed on said stem, the collar W slidingly secured on said stem adjacent to the collar M; the spring N sleeved upon said stem and acting against said sliding and fixed collars to close the valve, a valve-actuating rod in alinement with said stem having a tubular extension surrounding the stem and the spring X of lesser tension than the spring N interposed between the collar M and said valve-rod, the shoulder $e$ on said tubular extension adapted to clear the collar M and engage with the collar W, said shoulder being separated from the latter collar in the initial position of the valve-rod, and the arm V on said tubular extension for actuating the igniter mechanism whereby the opening of the valve is temporarily delayed until said shoulder releases the tension of the spring N.

In testimony whereof I affix my signature in presence of two witnesses.

RICHARD H. SCOTT.

Witnesses:
JAMES B. SEAGER,
F. A. WALL.